US008737103B2

(12) United States Patent
Kieferndorf et al.

(10) Patent No.: US 8,737,103 B2
(45) Date of Patent: May 27, 2014

(54) METHOD AND CONTROLLER FOR CONTROLLING AN ELECTRICAL CONVERTER CONFIGURED FOR GENERATING AN AC CURRENT FOR AT LEAST TWO PHASES

(75) Inventors: Frederick Kieferndorf, Fislisbach (CH); Georgios Papafotiou, Adliswil (CH); Nikolaos Oikonomou, Baden (CH); Tobias Geyer, Zurich (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/557,795

(22) Filed: Jul. 25, 2012

(65) Prior Publication Data

US 2013/0016549 A1    Jan. 17, 2013

Related U.S. Application Data

(63) Continuation of application No. PCT/EP2010/070518, filed on Dec. 22, 2010.

(30) Foreign Application Priority Data

Jan. 25, 2010 (EP) .................................. 10151549

(51) Int. Cl.
*H02M 7/537* (2006.01)
(52) U.S. Cl.
USPC ........................................................ 363/131
(58) Field of Classification Search
USPC ......... 363/34–37, 39, 41, 44, 51–53, 55, 126, 363/131, 132; 323/247, 251, 255
See application file for complete search history.

(56) References Cited

U.S. PATENT DOCUMENTS 7,164,254 B2 *  1/2007  Kerkman et al. ............. 318/812
7,990,097 B2 *  8/2011  Cheng et al. .................. 318/800

FOREIGN PATENT DOCUMENTS

EP         2 110 939 A1    10/2009

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Aug. 9, 2012, in the corresponding International Application No. PCT/EP2010/070518 (8 pages).
International Search Report (PCT/ISA/210) issued on Jan. 11, 2012, by the European Patent Office as the International Searching Authority for International Application No. PCT/EP2010/070518.
Written Opinion (PCT/ISA/237) issued on Jan. 11, 2012, by the European Patent Office as the International Searching Authority for International Application No. PCT/EP2010/070518.
European Search Report issued on Aug. 30, 2010 for Application No. 10151549.2.

(Continued)

*Primary Examiner* — Adolf Berhane
*Assistant Examiner* — Yemane Mehari
(74) *Attorney, Agent, or Firm* — Buchanan Ingersoll & Rooney PC (57) ABSTRACT

A method is provided for predicting pulse width modulated switching sequences for a multi-phase multi-level converter. With a first predicted switching sequence, due to multi-phase redundancies, equivalent switching sequences are determined. From the equivalent switching sequences, one switching sequence optimal with respect to a predefined optimization goal is selected. The selected switching sequence is used to switch the converter.

23 Claims, 7 Drawing Sheets

(56) References Cited

OTHER PUBLICATIONS

Tobias Geyer et al., "Model Predictive Direct Torque Control of a Variable Speed Drive with a Five-Level Inverter", Conference Proceedings IECON '09—35th Annual Conference of IEEE Industrial Electronics, Nov. 5, 2009, pp. 1203-1208, XP-002596524.

Tobias Geyer et al., "Model Predictive Direct Torque Control—Part I: Concept, Algorithm, and Analysis", vol. 56, No. 6, Jun. 5, 2009, pp. 1894-1905, XP-002596525.

Mario Marchesoni et al., "Diode-Clamped Multilevel Converters: A Practicable Way to Balance DC-Link Voltages", IEEE Transactions on Industrial Electronics, vol. 49, No. 4, Aug. 1, 2002, pp. 752-765, XP-011073743.

Joachim Holtz et al., "Optimal Control of a Dual Three-Level Inverter System for Medium-Voltage Drives", Industry Applications Society Annual Meeting, Oct. 5, 2008, pp. 1-8, XP-031354028.

Rene Vargas et al., "Predictive Control of a Three-Phase Neutral-Point-Clamped Inverter", IEEE Transactions on Industrial Electronics, vol. 54, No. 5, Oct. 1, 2007, pp. 3697-3705, XP-011190834.

Joachim Holtz et al., "Neutral Point Potential Balancing Algorithm at Low Modulation Index for Three-Level Inverter Medium Voltage Drives", Conference Record of the 2005 IEEE Industry Applications Conference Fortieth IAS Annual Meeting, vol. 2, Oct. 2, 2005, pp. 1246-1252, XP-010842542.

Josep Pou et al., "Evaluation of the Low-Frequency Neutral-Point Voltage Oscillations in the Three-Level Inverter", IEEE Transactions on Industrial Electronics, vol. 52, No. 6, Dec. 2005, pp. 1582-1588.

Jurgen K. Steinke, "Switching Frequency Optimal PWM Control of a Three-Level", IEEE Transactions on Power Electronics, vol. 7, No. 3, Jul. 1992, pp. 487-496.

Fei (Fred) Wang, "Multilevel PWM VSIs: Coordinated control of regenerative three-level neutral point clamped Pulsewidth-Modulated Voltage Source Inverters", IEEE Industry Applications Magazine, Jul./Aug. 2004, pp. 51-58.

* cited by examiner

METHOD AND CONTROLLER FOR CONTROLLING AN ELECTRICAL CONVERTER CONFIGURED FOR GENERATING AN AC CURRENT FOR AT LEAST TWO PHASES

RELATED APPLICATIONS

This application claims priority as a continuation application under 35 U.S.C. §120 to PCT/EP2010/070518, which was filed as an International Application on Dec. 22, 2010 designating the U.S., and which claims priority to European Application 10151549.2 filed in Europe on Jan. 25, 2010. The entire contents of these applications are hereby incorporated by reference in their entireties.

FIELD

The present disclosure relates to the field of power electronics. More particularly, the present disclosure relates to a method, a computerized implementation of the method, a controller for controlling a converter, and to such a converter.

BACKGROUND INFORMATION

A multi-level controller may be used for controlling a multi-phase electrical machine. The multi-level converter includes a phase module for each phase generating a number of different output voltages dependent on the design of the phase module. For example, a two-level phase module generates two output voltages (+UDC, 0) and a three-level phase module generates three output voltages (+UDC, 0, −UDC). A phase module may include a plurality of electrical switches, such as power semiconductor switches, which generate the output voltage of the respective phase according to a switching pattern or switching state, which describes which switches of the phase module are conducting (on) and which switches are blocking (off).

There are several possibilities (e.g., modulation methods) for generating these switching patterns.

For example, switching patterns may be determined with the concept of optimized pulse patterns (OPP). With optimized pulse patterns, a motor's operation may be based on pre-calculated switching patterns that achieve a certain minimization objective, such as the elimination of certain harmonics or the minimization of the total harmonic distortion of the motor current. However, when the motor speed or the amplitude of the voltage or both go below a certain threshold value, the number of pulses required for an optimized pulse pattern is so high that it may become prohibitive. Moreover, at such low values of the motor speed and/or voltage, the usage of optimized pulse patterns does not provide an advantage in terms of the produced value of total harmonic distortion of the motor current, when compared to other methods, such as pulse width modulation (PWM).

Thus, in the case of low motor speed and/or voltage, the concept of pulse width modulation (PWM) may be used. Here, for example, the average value of the output voltage over a modulation cycle that has to be fed to the electrical machine may be controlled by switching between the possible output voltages with a high frequency compared to the fundamental frequency of the AC output voltage.

Another possibility is to use the concept of direct torque control (DTC), in which states of the motor, for example, the torque and the magnetic flux, are estimated and are controlled to stay within their hysteresis bands by switching when the respective variable error reaches its upper or lower limit.

When any modulation method is used for the operation of a converter, in particular for one with a five-level topology, a key challenge arises: the proper choice of the actual converter switching patterns that reproduce the required output voltages while balancing the internal voltages of the converter (for example neutral point potential, floating capacitor voltages).

SUMMARY

An exemplary embodiment of the present disclosure provides a method for controlling a converter. The converter is configured for generating an AC current for at least two phases by outputting different voltage levels for each phase, wherein the different voltage levels depend on switching states of the converter. The exemplary method includes (a) generating a first sequence of voltage vectors, each voltage vector including a voltage level for each phase, by (i) generating a reference waveform for each phase, and (ii) determining the voltage levels for a phase for each voltage vector of the first sequence by deriving the voltage levels from the respective reference waveform for the phase. The exemplary method also includes (b) determining a set of equivalent sequences of voltage vectors by: (i) calculating voltage level differences for each voltage vector of the sequence of voltage vectors, the voltage level differences being differences of voltage levels of the voltage vector, (ii) determining an equivalent voltage vector with equal voltage differences, and (iii) generating an equivalent sequence by replacing at least one voltage vector of the first sequence with the equivalent voltage vector. The exemplary method also includes (c) selecting one sequence from the set of equivalent sequences which optimizes an internal state of the converter, when the sequence is applied to the converter. In addition, the exemplary method includes (d) applying the first voltage vector of the selected sequence to the converter.

An exemplary embodiment of the present disclosure provides a non-transitory computer-readable recording medium having a computer program recorded thereon that causes a processor of a computer processing device to execute operations for controlling a converter. The converter is configured for generating an AC current for at least two phases by outputting different voltage levels for each phase, wherein the different voltage levels depend on switching states of the converter. The operations include (a) generating a first sequence of voltage vectors, each voltage vector including a voltage level for each phase, by (i) generating a reference waveform for each phase, and (ii) determining the voltage levels for a phase for each voltage vector of the first sequence by deriving the voltage levels from the respective reference waveform for the phase. The operations also include (b) determining a set of equivalent sequences of voltage vectors by: (i) calculating voltage level differences for each voltage vector of the sequence of voltage vectors, the voltage level differences being differences of voltage levels of the voltage vector, (ii) determining an equivalent voltage vector with equal voltage differences, and (iii) generating an equivalent sequence by replacing at least one voltage vector of the first sequence with the equivalent voltage vector. In addition, the operations include (c) selecting one sequence from the set of equivalent sequences which optimizes an internal state of the converter, when the sequence is applied to the converter. The operations also include (d) applying the first voltage vector of the selected sequence to the converter.

An exemplary embodiment of the present disclosure provides a controller for controlling a converter. The converter is configured for generating an AC current for at least two phases by outputting different voltage levels for each phase, wherein the different voltage levels depend on switching states of the converter. The controller includes a processing unit configured to: (a) generate a first sequence of voltage vectors, each voltage vector including a voltage level for each phase, by (i) generating a reference waveform for each phase, and (ii) determining the voltage levels for a phase for each voltage vector of the first sequence by deriving the voltage levels from the respective reference waveform for the phase; (b) determine a set of equivalent sequences of voltage vectors by: (i) calculating voltage level differences for each voltage vector of the sequence of voltage vectors, the voltage level differences being differences of voltage levels of the voltage vector, (ii) determining an equivalent voltage vector with equal voltage differences, and (iii) generating an equivalent sequence by replacing at least one voltage vector of the first sequence with the equivalent voltage vector; (c) select one sequence from the set of equivalent sequences which optimizes an internal state of the converter, when the sequence is applied to the converter; and (d) apply the first voltage vector of the selected sequence to the converter.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings, and their meanings, are listed in summary form in the list of reference symbols. In principle, identical parts are provided with the same reference symbols in the drawings.

DETAILED DESCRIPTION

Exemplary embodiments of the present disclosure better balance internal states of an electrical converter that is controlled by the pulse width modulation method.

An exemplary embodiment of the present disclosure provides a method for controlling a converter.

According to an exemplary embodiment of the present disclosure, the converter is configured for generating an AC current for at least two phases by outputting different voltage levels for each phase, wherein the different voltage levels depend on switching states of the converter. For example, the converter may be used for supplying an electrical motor, for connecting a generator to a power grid, or for the interconnection of two power grids. The converter may be a direct or an indirect converter.

For generating the voltage levels for each phase, the converter may include a phase module for each controlled phase that includes switches generating the output voltages for the phase. Generally, the phase modules of the converter may have an equivalent design. The output voltage levels depend on the switching state of the switches (opened/closed for each switch). Due to redundancies that may be inherently available in converters, different switching states of the switches of the phase module may generate the same voltage level.

According to an exemplary embodiment of the present disclosure, the method includes the step of: (a) generating a first sequence of voltage vectors, each voltage vector including a voltage level for each phase, by: (i) generating a reference waveform for each phase; and (ii) determining the voltage levels for a phase for each voltage vector of the first sequence by deriving the voltage levels from the respective reference waveform for the phase.

A voltage vector may include a voltage level for each phase. When a voltage vector is applied to the converter, the switches of each phase modules have to be switched such that the voltage level of the voltage vector for the respective phase is output by the respective phase module. A sequence of voltage vectors may include a set of voltage vectors which may be output by the converter at consecutive time instants to generate a modulated output voltage for each phase.

In step (a), the first switching sequence is determined by so-called carrier based pulse width modulation (CB-PWM). In this case, the switching instances may be derived by the intersection of the carrier waveform and the reference waveform. A switching instant may include a voltage level and a switching time. Additionally, a switching instant may include a switching state of the phase module that results in the voltage level.

For each phase, the reference waveform may be the waveform that in the average should be output by the respective phase module. The reference waveform may be determined based on the frequency, the torque or other variables in order for the motor to fulfill certain requirements. The carrier waveform usually is a periodic waveform with a higher frequency as the reference waveform. For example, the carrier waveform may have a period in a range of 200 to 1000 µs. For deriving the switching instants for each phase, the carrier waveform is intersected with the reference waveform and the intersection points determine the switching time of the switching instant. The voltage level of the switching instant, for example, the voltage level that should be applied to the respective phase module, may also be derived from the slope of the carrier waveform at the intersection point and from the magnitude of the voltage at the intersection point.

From the switching instants at the same switching time, a voltage vector at the switching time may be formed. The time-order voltage vectors then may form the first switching sequence.

According to an exemplary embodiment of the present disclosure, the method includes the step of: (b) determining a set of equivalent sequences of voltage vectors by: (i) calculating voltage level differences for each voltage vector of the sequence of voltage vectors, the voltage level differences being differences of voltage levels of the voltage vector; (ii) determining an equivalent voltage vector with equal voltage differences; and generating an equivalent sequence by replacing at least one voltage vector of the first sequence with the equivalent voltage vector.

In step (b), the so-called multi-phase redundancy is used for generating equivalent sequences, for example, sequences that generate the same currents in the motor, when the sequence is applied to the motor. (When a sequence is applied to the motor, the voltage vectors of the sequence are applied consecutive to the converter. After the application of a voltage vector, the controller waits a predefined time (which may be defined by the switching times) before applying the next voltage vector. It has to be understood that the sequences are usually not applied to the motor but are used for estimating or simulating the behavior of the converter or the motor for deriving values that have to be optimized.)

As not the voltage differences between the potential at the terminals of the motor with respect to the neutral point of the converter, but the voltage differences between the motor terminals generate the current in the motor, two voltage vectors with equal voltage differences between the phases will generate the same current in the motor. Thus, the voltage differences of all voltage vectors of the sequence may be determined and equivalent voltage vectors with equal voltage differences may be used to generate equivalent sequences. For example, equivalent voltage vectors may be stored in a lookup table.

To get all possible equivalent sequences, all possible combinations of equivalent voltage vectors may be replaced in the first sequence.

It has to be noted that also so-called one-phase redundancies may be used for generating equivalent sequences. A one-phase redundancy refers to the fact that different switching states of a multi-level converter module can generate the same output voltage level. In this case, a switching state has to be assigned to each voltage level. Thus, the sequences include the switching states of the phase modules.

According to an exemplary embodiment of the present disclosure, the method includes the step of: (c) selecting one sequence from the set of equivalent sequences which optimizes an internal state of the converter, when the sequence is applied to the converter.

In step (c), for all equivalent sequence, internal states of the converter are estimated, when the respective sequence would be applied to the converter. For example, the neutral point potentials or potentials of the capacitors may be calculated. Then the sequence is selected which has optimal internal states.

According to an exemplary embodiment of the present disclosure, in step (c) the sequence is selected such that at least one of the following internal states of the converter is optimized: a neutral point potential lies within predefined bounds, switching losses and/or the switching frequency are minimized, a common mode voltage and/or variations of the common mode voltage are minimized, an average deviation of an internal state from a predefined internal state is minimal.

According to an exemplary embodiment of the present disclosure, in step (c) the sequence is selected by: (i) estimating the internal state (or the development of the internal state which respect to time) of the converter by applying the sequence to a model of the converter; and (ii) selecting the sequence with the optimal estimated internal state.

According to an exemplary embodiment of the present disclosure, the method includes the step of: (d) applying the first voltage vector of the selected sequence to the converter.

In step (d) not the whole selected sequence, but only the first voltage vector of the sequence is applied to the converter.

According to an exemplary embodiment of the present disclosure, the reference waveform is generated based on at least one of a reference profile and a maximum amplitude.

The reference profile may be a periodic function, for example a sinusoidal function. Also higher-order periodic deviations may be added. For example the reference profile $\sin(x)+\sin(3x)$ may have the advantage of maximizing the utilization of the power converter DC link voltage applied to the motor. The reference profile may include a set of discrete values that are stored in a lookup table.

The reference time may be used for defining at which position within the period of reference profile the reference waveform starts. This may depend on the current angular position of the respective phase, for which the reference waveform has to be calculated.

The maximal amplitude may define the maximal value of the reference waveform. The maximal amplitude may be based on a modulation index of the motor the converter is connected to. The modulation index may relate to the maximal amplitude of the voltage that should be applied to the motor and may be derived from the model of the motor, the torque and the angular velocity of the motor.

The reference waveform for each phase may be based on the model of the electric machine the converter is connected to. Several rated values exist for the machine: torque, stator flux, rotor flux, and stator current. The reference waveform has to be chosen such that these rated values are met.

According to an exemplary embodiment of the present disclosure, in step (a) of the method, a voltage level for a phase is derived from the reference waveform by intersecting the reference waveform with at least one carrier waveform having periodic positive and negative slopes. As already explained, from the intersections of the reference waveform with the carrier waveform, the switching time and the voltage level for the switching instant may be derived.

According to an exemplary embodiment of the present disclosure, each voltage level of a phase relates to a time instant or time point, wherein the time instant may be the time instant at which the carrier waveform intersects the reference waveform. Each derived voltage level for a phase may be related to a certain time instant. If a carrier waveform intersects the reference waveform, a new voltage level for the phase is generated. The new voltage level is related to the time instant of the intersection.

All voltages levels for all phases may be generated (or predicted) for a predetermined future time period by the method.

After all voltage levels for the predetermined time period have been generated, the voltage levels relating to one time instant are gathered to a voltage vector. If at a time instant only voltage levels for certain phase, but not for all phases exists, a voltage vector with the at the time instant sustained voltage value of the missing phase may be inserted into the voltage vector. In this way, a voltage vector may be related to a time instant, for example, the time instant of its voltage levels.

The sequence of voltage vectors may be generated from voltage vectors ordered by their time instants.

According to an exemplary embodiment of the present disclosure, at least one carrier waveform covers an interval between a lower voltage level and a higher (consecutive) voltage level of the converter. The converter (and in particular a phase module) may be configured to generate N voltage levels. Thus, N−1 carrier waveforms may be generated. For example, if the converter has the voltage levels {−1, 0, 1}, there may be two carrier waveforms one covering −1 to 0 and one covering 0 to 1. For a five-level converter there may be four carrier waveforms.

According to an exemplary embodiment of the present disclosure, the voltage level is set to the lower voltage level, if the reference waveform intersects a positive slope of the carrier waveform and the voltage level is set to the higher voltage level, if the reference waveform intersects a negative slope of the carrier waveform. Each positive slope may be on a first half of a carrier period and each negative slope may be on a second half of the carrier period. In this way, when the reference waveform is between two voltage levels, alternating switching instants are created that create the same average voltage as the reference waveform.

For example, in the positive slope the carrier waveform may linearly increase from the lower voltage level to the higher voltage level, and in the negative slope the carrier waveform may linearly decrease from the higher voltage level to the lower voltage level. Thus, a carrier waveform may be a lambda-shaped (λ) function, the minimal value of the function may be a first (lower) voltage level and the maximal value of the function may be a second (the one higher) voltage level. With a carrier function having only straight sections, the calculation of the intersections may be straight forward.

According to an exemplary embodiment of the present disclosure, an additional voltage level for a phase is derived from the reference waveform, when the reference waveform intersects a voltage level between two carrier waveforms, wherein the additional voltage level for a phase is set to the next higher voltage level, if the reference waveform increases at the instant of intersection, and the additional voltage level for and phase is set to the next lower voltage level, if the reference waveform decreases at the instant of intersection. As all voltage levels, also the additional voltage level of a phase may be related to a time instant, wherein the time instant is the time instant at which the reference waveform intersects the voltage level between two carrier waveforms.

According to an exemplary embodiment of the present disclosure, the reference waveform includes a sequence of voltage values, each voltage value relating to a time instant. These time instants may correspond to the time instants where the carrier slope reverses. The reference waveform may be a discrete curve. Each voltage value may be related to an instant or point in time. Consecutive voltage values may be separated by a half of the called carrier period.

When calculating the intersection between a carrier waveform and the reference waveform, the reference waveform may be interpolated between the voltage values.

For example, the reference waveform between a first voltage and a consecutive second voltage values may be interpolated as being the first voltage value. In this case, the reference waveform may be seen as a step function. Alternatively, the reference waveform may be linearly interpolated between a first voltage value and a consecutive second voltage value.

An exemplary embodiment of the disclosure provides a program element (a computer program) for controlling a converter, which when being executed by at least one processor is configured for executing the steps of the method as described in the above and in the following. For example, the processor may be a processor of the controller. In accordance with an exemplary embodiment, the program element (computer program) is tangibly recorded on a non-transitory computer-readable recording medium, which may be any type of non-volatile memory capable of recording such program.

An exemplary embodiment of the present disclosure also provides a non-transitory computer-readable medium, in which such a program element is stored (recorded).

Examples of a non-transitory computer-readable medium include, but are not limited to, a floppy disk, a hard disk, a USB (Universal Serial Bus) storage device, a RAM (Random Access Memory), a ROM (Read Only memory), an EPROM (Erasable Programmable Read Only Memory), or a FLASH memory. In accordance with an exemplary embodiment, the program may be downloaded from a data communication network, e.g. the Internet, and recorded on the computer-readable medium.

It is also possible that the method is implemented with a FPGA (field-programmable gate array).

An exemplary embodiment of the present disclosure provides a controller for controlling a converter, which is configured for executing the method as described in the above and in the following. The controller may include a processor and a memory with the program element to be executed on the processor. Alternatively the controller may include the FPGA.

An exemplary embodiment of the present disclosure also provides a converter.

According to an exemplary embodiment of the present disclosure, the converter includes a converter circuit with switches, the converter circuit being configured for generating output voltages for at least two phases, the output voltages corresponding to different voltage levels generated by switching states of the switches. The converter circuit may include the above mentioned phase modules for generating the output voltages.

According to an exemplary embodiment of the present disclosure, the converter includes a controller for controlling the switches, the controller being configured for executing the method as described in the above and in the following.

The method as described in the above and in the following is generic and may be applicable to any setup of a multi-level converter controlled by a carrier-based pulse-width modulation technique, for which predictions of the future switching events can be applied to a predictive internal voltage regulation function.

To summarize, a method for predicting pulse width modulated switching sequences for a multi-phase multi-level converter is provided. With a first predicted switching sequence, due to multi-phase redundancies, equivalent switching sequences are determined. From the equivalent switching sequences one switching sequence optimal with respect to a predefined optimization goal is selected. The selected switching sequence is used to control the converter.

It is to be understood that features of the method as described in the above and in the following may be features of the devices as described in the above and in the following.

If technically possible but not explicitly mentioned, also combinations of embodiments of the present disclosure described in the above and in the following may be embodiments of the method and the devices.

These and other aspects of the disclosure will be apparent from and elucidated with reference to the exemplary embodiments described hereinafter.

Figure 1:
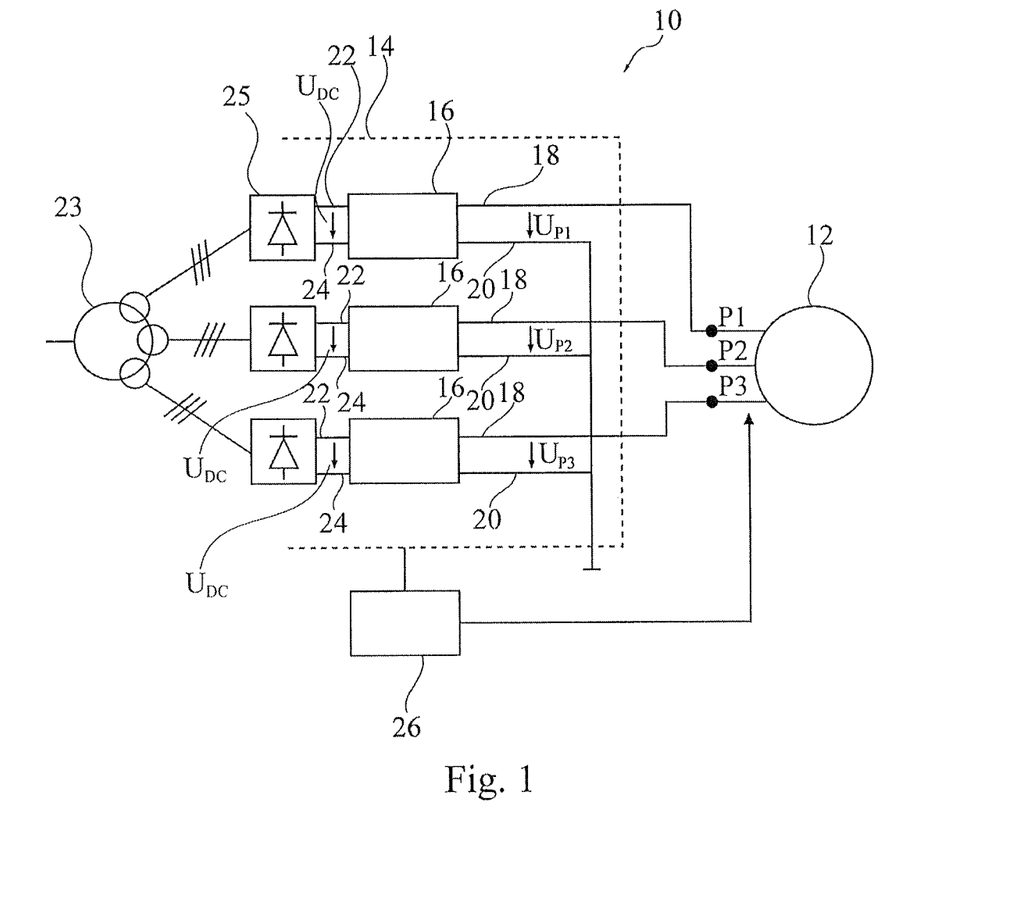
FIG. 1 schematically shows a motor system with a converter according to an exemplary embodiment of the present disclosure.

FIG. 1 shows a motor system 10 with a three-phase motor 12 and a converter with a converter circuit 14. The converter circuit 14 includes a phase module 16 for each phase P1, P2, P3 to be supplied to the motor. Each of the phase modules 16 has an output 18 connected to the respective phase P1, P2, P3 of the motor 12 and an output 20 that may be used for earthing (grounding) the phase module 16. In accordance with an exemplary embodiment, the terminal 20 is left floating so as to act as a virtual ground. Between the outputs 18 and 20 each phase module 16 is adapted to generate the respective output AC voltage $U_{P1}$, $U_{P2}$, $U_{P3}$. Each of the phase modules further has two inputs 22, 24 which are connected to a separate DC supply voltage $U_{DC}$. The motor system 10 includes further a transformer 23 which supplies three diode rectifiers 25 with AC current. For example, the transformer 23 may have three or six phase connections on the secondary side. The diode rectifiers 25 may be 6- or 12-pulse rectifiers for generating the supply voltage $U_{DC}$.

The motor system may be a medium voltage system, for example, the supply voltage $U_{DC}$ may be in a range between 1 kV and 50 kV.

The converter includes further a controller 26 that is configured to receive control signals like the phase currents from the motor 12 and to control the converter circuit 14 by sending or applying switching state commands to the phase modules, for example, by turning switches on or off in the phase modules. From the received control signals, the controller 26 estimates internal states of the motor like stator flux, rotor flux, and the electromagnetic torque. With the aid of these quantities the desired phase voltages $U_{P1}$, $U_{P2}$, $U_{P3}$ are calculated by the controller 26.

Figure 2:
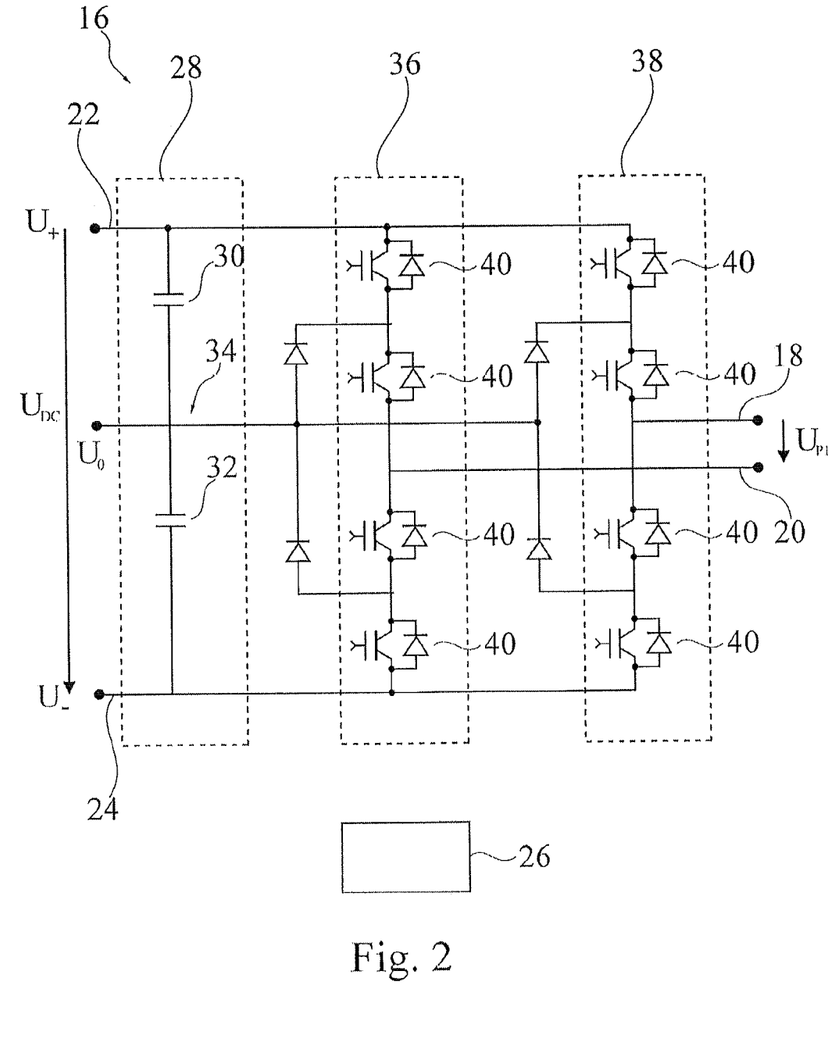
FIG. 2 schematically shows a phase module according to an exemplary embodiment of the present disclosure.

FIG. 2 shows a possible design of the phase modules 16, which is configured to generate five different output voltages $U_{P1}$. With three such phase modules 16, the converter becomes a five-level converter providing the phase voltages $U_{P1}$, $U_{P2}$, $U_{P3}$. The single-phase module 16 is used for ABB's ACS5000 converter topology.

The phase module 16 includes a DC link 28 with two capacitors 30, 32 connected in series between the inputs 22 and 24. Between the two capacitors 30, 32, the neutral point 34 of the phase module is defined.

The phase module 16 further includes a first inverter circuit 36 and a second inverter circuit 38. Each of the inverter circuits 36, 38 include four power semiconductor switches 40, which are connected in series. The ends of the two series of switches are connected in parallel across the DC link 28 and to the inputs 22, 24.

Between the first and the second switch 40 and between the third and the forth switch 40 of each of the inverter circuits 36, 38, there is a connection to the neutral point 34 of the phase module. The output 18 is connected between the second and third switch 40 of the inverter circuit 38. The output 20 is connected between the second and third switch 40 of the inverter circuit 36.

The phase module 16 is configured to generate five different voltage levels between the outputs 18, 20. The voltage levels are generated by connecting the outputs 18, 20 to the input 22 (with a positive potential $U_+$), the input 24 (with a negative potential $U_-$) or to the neutral point 34 (with a neutral point potential $U_0$).

The connections are generated by the controller 26 which opens and closes the switches 40 according to a switching state of the phase module.

At high motor speed, the controller 26 calculates the switching states according to the optimized pulse pattern (OPP) method, which relies on the precalculation of a set of pulse patterns (that may be coded as sequences of voltage vectors) that represent the voltages the converter needs to supply to the motor at steady state, such that a certain minimization criterion is fulfilled. These pulse patterns are stored in look-up tables. During the operation of the motor the controller 26 reads the pulse patterns out of these tables that should be applied to the motor 12, depending on the operating conditions. However, the only information that is contained in the OPP and that is read out of the look up table is the angular position (for example, the time instant) and the voltage levels (e.g. $-V_{DC}$, $-V_{DC}/2$, 0, $V_{DC}/2$, $V_{DC}$ for each phase module 16) that needs to be applied to the motor phase terminals P1, P2, P3.

At low motor speed, the controller 26 calculates the switching states according to the carrier based pulse width modulation (CB-PWM) method as explained in the above and in the following. In this operating region (low motor speed) CB-PWM may be advantageous because of the high carrier frequency to fundamental frequency ratio. In particular, the switching states of the phase modules 16 are determined by the controller 26 by executing the control method as explained in the above and in the following. The considerations with respect to the OPP method apply also to the CB-PWM method.

When operating a conventional two-level converter, every possible phase voltage corresponds to a unique switch combination (switching state) that can produce it, creating a one-to-one mapping between the required voltages and the corresponding switch positions. However, this is not the case with the multi-level converter, where the so-called single- and three-phase redundancies are present.

Specifically, the term single-phase redundancy describes the availability of two (or more) different switching states of one of the phase modules that produce the same phase voltage (for example $U_{P1}$) but that have the opposite effect on the neutral point potential $U_0$ or on a floating capacitor voltage: if one configuration increases the voltage, the other (for the same current) decreases it. With respect to FIG. 2, one can achieve the same phase voltage ($U_{P1}$) by either connecting 18 to 22 and 20 to 34 or 18 to 34 and 20 to 24. The first option will, for a positive current, decrease the neutral point potential $U_0$ while the second will (for the same current) increase it. The single-phase redundancies are commonly exploited for balancing internal converter voltages, as they provide alternatives for the phase voltage required by the modulation scheme that can steer the internal voltages to the desired direction.

Figure 3:
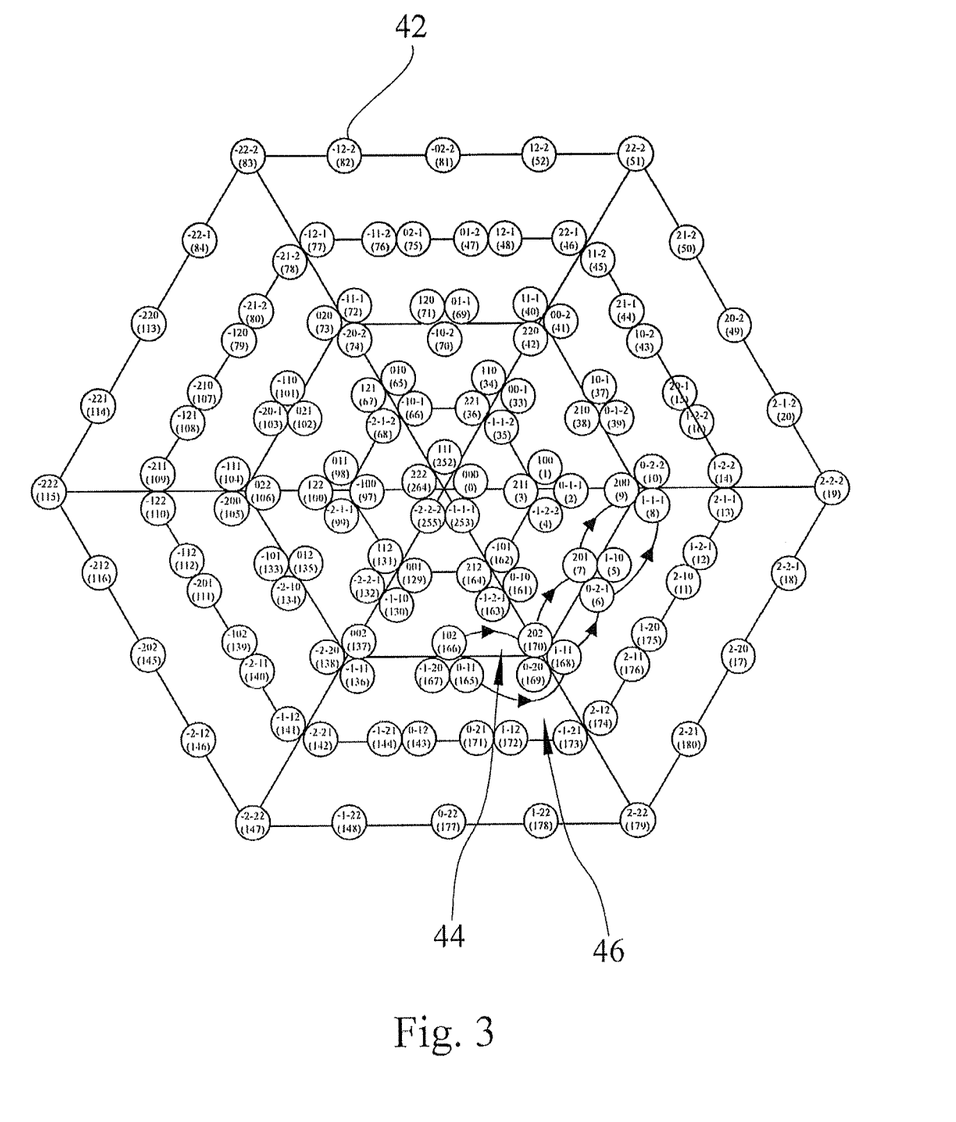
FIG. 3 shows a diagram with voltage vectors for a converter according to an exemplary embodiment of the present disclosure.

FIG. 3 shows a diagram with the possible voltage vectors 42 of a five-level converter such as 14. Inside each circle for a voltage vector 42, three numbers are given that indicate the three voltage levels of the voltage vector. For example, the voltage vectors 42 includes the voltage levels −1, 2, −2 corresponding to an output of the three phase modules of: $U_{P1}=-U_{DC}/2$, $U_{P2}=U_{DC}$ and $U_{P3}=-U_{DC}$. The voltage vector 42 may be described by (−1 2 −2). As may be derived from the diagram only the voltage vector 42 has the voltage differences −3=−1−(+2) and 4=2−(−2).

FIG. 3 shows further a switching sequence 44 including the voltage vectors (1 0 2), (2 0 2), (2 0 1) and (2 0 0) and an equivalent switching sequence including the voltage vectors (0 −1 1), (1 −1 1), (0 −2 −1) and (1 −1 −1). For example, the first voltage vector (1 0 2) and (0 −1 1) of the two switching sequences 44, 46 have the same voltage differences 1 and −2.

The term three-phase redundancy refers to the redundancies in the voltage differences between the output voltages $U_{P1}$, $U_{P2}$, $U_{P3}$, i.e. the case where different phase voltages can be combined to provide the motor terminals P1, P2, P3 with the same line-to-line voltage. Since all the electrical quantities of the motor depend on the line-to-line voltage rather than the individual phase voltages $U_{P1}$, $U_{P2}$, $U_{P3}$, an even larger number (compared to the single-phase case) of redundant switch positions exist. These switch positions generate equal line-to-line voltages at the machine terminals P1, P2, P3. This is shown in FIG. 3, where one can observe how different combinations of single phase voltages can generate the same line-to-line voltage (voltage differences) and thus the same voltage vector on the αβ-plane.

Thus, in a multi-level converter (in contrast to the two-level converter case), no one-to-one mapping exists, neither between the phase voltages $U_{P1}$, $U_{P2}$, $U_{P3}$ and the corresponding phase module switching states due to single-phase redundancies, nor between the line-to-line voltage (voltage differences) and the overall converter switching states due to the three-phase redundancies. This implies that when a voltage is required by the OPP or the CB-PWM, an algorithm may be needed to decide (out of the many options that exist) on the appropriate switch positions that achieve the voltage requested by the OPP or the CB-PWM, while balancing the converter internal quantities and additionally reducing its switching losses, reducing its switching frequency, minimizing common mode voltage values, etc.

Figure 4:
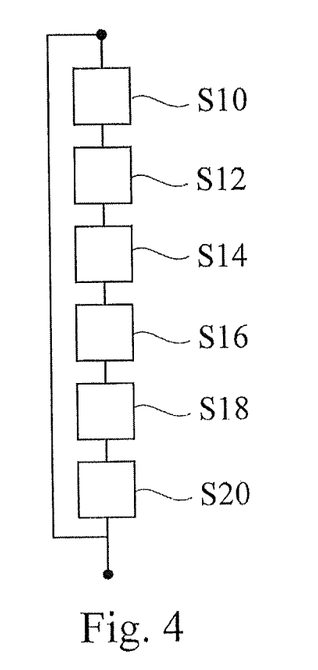
FIG. 4 shows a flow diagram for a method for controlling a converter according to an exemplary embodiment of the present disclosure.

FIG. 4 shows a flow diagram for a method for controlling the converter.

In a step S10, a first sequence of voltage vectors is generated. Dependent on the motor speed either the sequence is generated from OPP patterns or with the algorithm for generating a CB-PWM based sequence described in detail below. In both cases the sequence may be determined dependent on operating conditions of the motor system 10, such as load torque, speed, motor current, and so on. For example, the generated sequence is the sequence 44 shown in FIG. 3.

In a step S12, for each voltage vector of the generated (first) sequence, equivalent voltage vectors with equal voltage differences are determined. For example, for the first voltage vector (1 0 2) of the sequence, these would be the voltage vectors (−1 −2 0) and (0 −1 1). This may be done with the aid of a look up table, which in principle stores the information shown in FIG. 3. Then all possible combinations of equivalent sequences are generated by replacing the voltage vectors of the first sequence with equivalent voltage vectors. One of these sequences would be the sequence 46. Further, to use the one-level redundancies, in each equivalent sequence, each voltage level of each voltage vectors is supplemented with a switching state generating the voltage level. From this sequences equivalent sequences with equal voltage vectors but with different switching states are derived by replacing the switching states with equivalent switching states, for example, switching states generating the same voltage level for the phase.

In a step S14, for each sequence of the set of equivalent sequences generated in step S12, effects of the switchings defined by the sequence on the converter are estimated. In particular, the variation of the neutral point potential $U_0$ of each phase module 16 is calculated with the aid of the integral $$U = \frac{1}{C} \int_{T0}^{T1} i(t)\, dt,$$

with which the voltage U over each of the capacitors 30, 32 may be calculated. C corresponds to the capacitance of the capacitors 30, 32 of the DC link 28 and i(t) the current flowing to the respective capacitor 30, 32. The current i(t) depends on the switching state of the phase module 16 encoded in the switching sequence and the motor current of the respective phase. The motor current may be calculated with a model of the motor 12 or may be estimated with a simple sinusoidal function under the assumption that the motor current of the respective phase is substantially determined by its fundamental mode. The times T1 and T2 are determined by the switching sequence which also includes the times when the switchings have to be applied to the converter.

In a step S16, the sequences are selected for which the neutral point potential $U_0$ for all phases stays within predefined bounds.

In a step S18, for each sequence selected in step S16 the switching losses are estimated. After that, the sequence with the smallest switching losses is selected as the optimal sequence. Alternatively or additionally, further optimization criterions may be the switching frequency or the common mode voltage, etc.

In a step S20, the first voltage vector of the optimal sequence is applied to the converter. Before applying the next voltage vector, the steps S12 to S18 are executed again, to determine a new optimal sequence, which may deviate from the previous determined optimal sequence, for example due to changes in torque, load or motor currents.

The method for optimizing internal states of the converter described herein does not create additional commutations that increase the switching losses, and does not interfere with the harmonic volt-second balance commanded by the pulse width modulator. Therefore the harmonic distortion of voltages and currents does not increase. The method allows for easy adaptation to different multi-level converter cases.

When using the optimization method for PWM, predicted future converter switching instants allow for the balancing of the converter's internal voltages (neutral point potentials, floating capacitor voltages), while satisfying specified objectives (reduced switching losses, as an example). With OPP, predicted future switching instants (for example, the first sequence of voltage vectors) may be already present in the controller 26.

When the controller 26 uses PWM, in particular includes a CB-PWM modulator (programmed in a FPGA, as an example) for controlling the converter, future converter switching instants may not be present for the optimization method, since the CB-PWM modulator may only calculate the next needed switching instant. Thus, one difficulty in the application of CB-PWM may lie in the fact that the future switching instants are not predetermined as for OPPs.

For use of the method with a CB-PWM modulator, the upcoming switching instants may be pre-calculated online in an efficient manner according to the following algorithm, an online method of computing the next several switching instants in real time.

Figure 5:
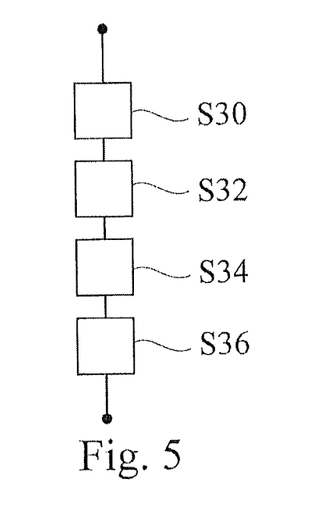
FIG. 5 shows a flow diagram for a method for predicting a first sequence of voltage vectors according to an exemplary embodiment of the present disclosure.

FIG. 5 shows a flow diagram for a method or algorithm for generating a CB-PWM based sequence of voltage vectors, which may be executed in step S12 of the method of FIG. 4 for generating the first sequence of voltage vectors. The method may be seen as a computational method for prediction of CB-PWM switching instants for the predictive internal voltage balancing algorithm of the multi-level converter. The method may be based on asymmetric sampling of a reference waveform.

In a step S30 a reference waveform 50 and the carrier slopes 54 for each phase are calculated. This step will be explained with reference to FIG. 6 and FIG. 7.

Figure 6:
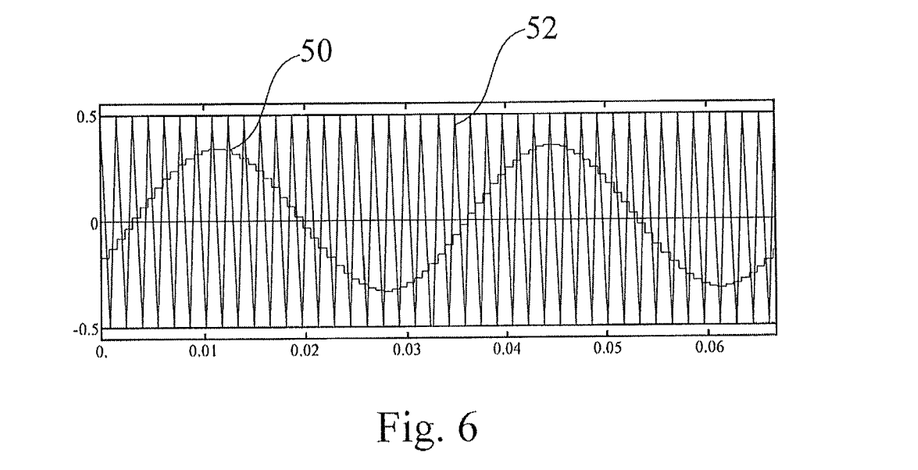
FIG. 6 shows a diagram with an example of a reference waveform according to an exemplary embodiment of the present disclosure.

FIG. 6 shows a diagram with the scaling of a reference waveform 50 and a carrier waveform 52 for a 2-level converter. To simplify the required computation the reference waveform 50 and the carrier waveform 52 are scaled so that the peak-to-peak base value is one. In particular, the two waveforms 50, 52 only include values between −0.5 and 0.5. The diagram shows the development of the two waveforms 50, 52 with respect to time in seconds.

The reference waveform 50 of FIG. 6 can be generated with the following equation $$V_{REF} = \frac{M_i}{2}\cos(\omega_s t + \theta) + V_{off},$$

where $M_i$ is the modulation index (a maximal amplitude), $\omega_s$ is the fundamental frequency of the motor 12 and $\theta$ is a phase shift. In the present case $V_{off}=0$ since the reference waveform 50 is a simple sinusoidal wave.

Figure 7:
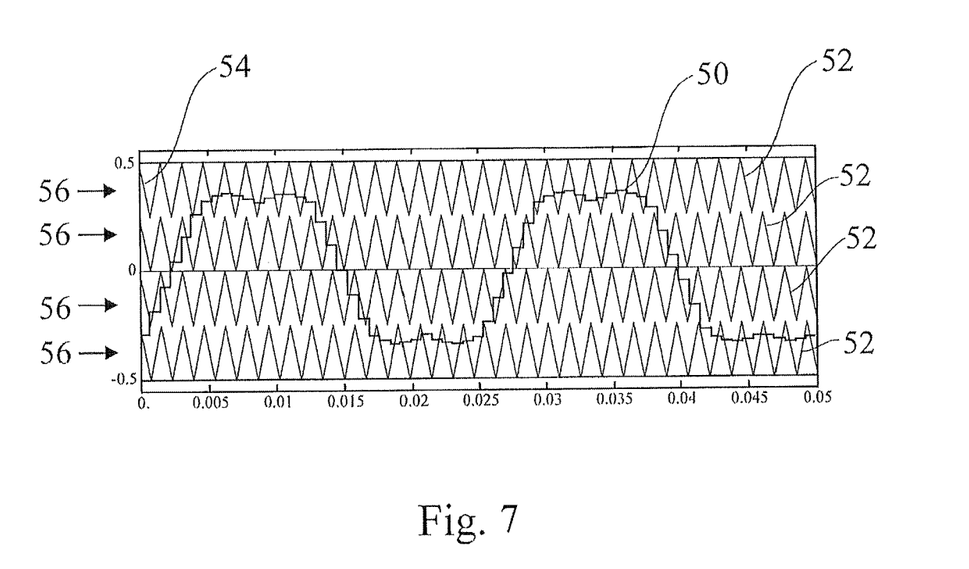
FIG. 7 shows a diagram with a further example of a reference waveform according to an exemplary embodiment of the present disclosure.

In principle, any of the well-known reference waveforms may be used. For example, FIG. 7 shows a diagram with the scaling of a reference waveform 50 and four carrier waveforms 52 for a 5-level converter. The reference waveform 50 of FIG. 7 is a superposition of the reference waveform 50 of FIG. 6 with higher-order harmonics.

At the beginning, the phase of the carrier waveform 52 and the reference waveform have to be synchronized with the current state of the converter. In particular, for the reference waveform, the parameters $M_i$, $\omega_s$, $\theta$ have to be determined. For synchronizing, the algorithm uses the information from the CB-PWM modulator providing the present operating point of the converter. This information may include the 3-phase voltage level state, the slope of the next carrier cycle and the current clock time of the FPGA.

In general, the generated reference waveform 50 is a sequence of N voltage values, where N is the length of the prediction horizon of the method, i.e $V_{REF}(k)$ with k=0, 1, ..., N−1. The time instants relating to each voltage value (sample instant) of the reference waveform 50 are at the peak and valley of the carrier waveform 50, for example, corresponding to two times the carrier frequency.

Due to the special profile of the carrier waveforms 50, only the first carrier slope 54 (positive or negative) of the carrier waveforms 50 has to be determined and is set according to the next carrier signal from the CB-PWM modulator. The future carrier slopes are alternating positive and negative slopes or vice versa. Note that the algorithm does not calculate the carrier waveforms 50, which are only shown in FIGS. 6 and 7 to illustrate the method.

In principle, the voltage values of the reference waveforms 50 for each of the three phases are pre-calculated along with the sequence of carrier signal slopes for a predefined prediction horizon N, for example N=4. The prediction horizon of N voltage values of each of the three-phase PWM waveform begins with a first voltage value synchronized with the current state of the converter. Next, the future voltage values are calculated assuming a steady state operating point, for example, constant modulation index $M_i$ and reference frequency $\omega_s$, for example with the above referenced formula for $V_{REF}$.

Figure 8:
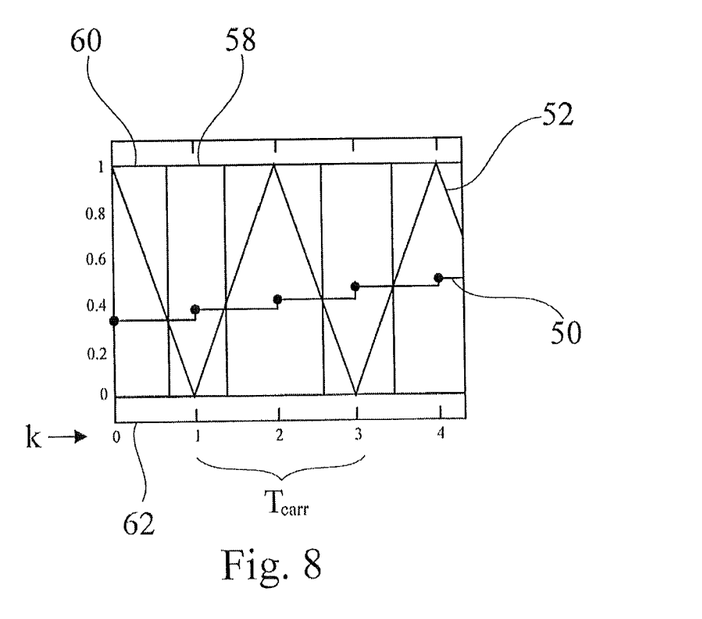
FIG. 8 shows a diagram with a scaled and shifted reference waveform according to an exemplary embodiment of the present disclosure.

In a step S32 (see FIG. 5), the values of the reference waveform 50 are scaled and shifted from the carrier levels 56 to the range [0, 1] as shown in FIG. 8. A carrier level 56 is defined by two consecutive voltage levels of the converter. If the converter has $n_{levels}$ voltage levels, there are $n_{levels}-1$ carrier levels. As is indicated in FIG. 7, a five-level converter 16 has four carrier levels 56 and each carrier level 56 is covered by one carrier waveform 52.

An example of scaling and shifting of the waveform begins with the carrier waveforms 52 and reference waveform 50 for a five-level converter shown in FIG. 7. The reference waveform 50 is scaled with ($n_{levels}-1$) so that each carrier level 56 has a peak to peak magnitude of 1. Each carrier level 56 is than shifted to the range [0, 1], for example the part of the reference in each carrier level is shifted respectively by: top (−1), upper middle (0), lower middle (+1) and bottom (+2). For each carrier level 56, the voltage values of the reference waveform 50 that in the end do not have a value in the range [0, 1] are discarded. After the scaling and the shifting, for each carrier level 56 there is a scaled reference waveform as indicated in FIG. 8. In FIG. 8 also the time axis has been scaled such that the time instant of the voltage values of the reference waveform 50 correspond to the time index k (a natural number).

For a five-level converter, this calculation may be done in a way that the values of the reference waveform 50 of FIG. 7 are partitioned with respect to the carrier levels 56. For each k:
The top carrier level: $0.5 \geq V_{ref}(k) > 0.25$
The upper middle carrier level: $0.25 \geq V_{ref}(k) > 0$
The lower middle carrier level: $0 \geq V_{ref}(k) > -0.25$
The bottom carrier level: $-0.25 \geq V_{ref}(k) > -0.5$
After partitioning the reference values for each carrier level 56 they are scaled and shifted:

$$V_{ref\_newt2}(k)=(n_{levels}-1)V_{ref}(k)-1 \text{ for } 0.5 \geq V_{ref}(k) > 0.25$$

$$V_{ref\_newt1}(k)=(n_{levels}-1)V_{ref}(k)-0 \text{ for } 0.25 \geq V_{ref}(k) > 0.25$$

$$V_{ref\_newb1}(k)=(n_{levels}-1)V_{ref}(k)+1 \text{ for } 0 \geq V_{ref}(k) > -0.25$$

$$V_{ref\_newb2}(k)=(n_{levels}-1)V_{ref}(k)+2 \text{ for } 0.25 \geq \geq V_{ref}(k) \geq =0.5$$

where $n_{levels}=5$ in this particular example.

In a step S32 (see FIG. 5) the switching instants (voltage levels and time points, i.e. time instants) for each carrier level 56 (and for each phase) are calculated. For the scaled reference waveform 50 in FIG. 8, only two voltage levels 60, 62 bounding or limiting the carrier level 56 are possible. Due to the scaling the two voltage levels are 0 and 1 in FIG. 8.

With the CB-PWM method, the output voltage waveform 58 is set to the lower voltage level 62, if the reference waveform 50 intersects a positive slope of the carrier waveform 52 and the voltage level is set to the higher voltage level 60, if the reference waveform 50 intersects a negative slope of the carrier waveform 52.

As a function of the reference waveform 50, the output voltage waveform 58 may be a vector $V_{OUT}(k)$ with k=0, ..., N−1

$V_{OUT}(k)=0$ (for positive carrier slope)

$V_{OUT}(k)=1$ (for negative carrier slope)

To produce the correct output levels, the values $V_{OUT}(k)$ have to be scaled and shifted back to the scaling of FIG. 7.

With the scaling of the scaled reference waveform 50, the location (time instant) of the switching instants within a half carrier cycle are directly proportional to the scaled voltage value depending on the period of the carrier waveform:

$$t_{sw}(k) = V_{ref\_new}(k)\frac{T_{carr}}{2} \text{ (for positive carrier slope)}$$

$$t_{sw}(k) = (1 - V_{ref\_new}(k))\frac{T_{carr}}{2} \text{ (for positive carrier slope)}$$

where $T_{carr}$ is the carrier period.

During the previous calculations, it has been assumed that the value of the reference waveform 50 is sustained between two time instants k. Alternatively, according to a second embodiment linear interpolation between the voltage values of the reference waveform 50 is possible to calculate the intersection point of the reference waveform 50 and the carrier waveform 52. In this case S32 is modified to calculate the intersection of two lines.

In a step S34 (see FIG. 5) additional switching instants are calculated as necessary.

Figure 9:
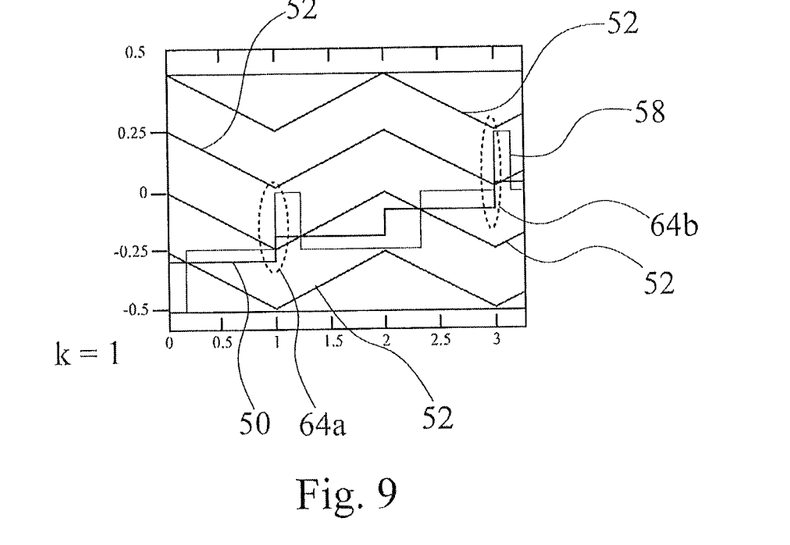
FIG. 9 shows a diagram with an output voltage waveform with additional voltage levels according to an exemplary embodiment of the present disclosure.

FIG. 9 shows an output voltage waveform 58 with additional switching instants 64a, 64b caused by a jump of the reference waveform 50 from one carrier level 56 to the next due to sampling.

The additional switching instants 64a, 64b or additional voltage levels 64a, 64b correspond to points where the reference waveform 50 crosses a voltage level between two carrier waveforms 52. The additional voltage level 64a, 64b is set to the next higher voltage level, if the reference waveform 50 increases at the point of intersection and the additional voltage level for a phase is set to the next lower voltage level, if the reference waveform decreases at the point of intersection.

For example, the first additional switching instant 64a at k=1 transitions to a voltage level of 0, since the reference waveform at k=1 intersects the voltage level of −0.25. The second additional switching instant 64b transitions to a voltage level of 0.25 since the reference waveform 50 intersects the voltage level of 0.

To determine the locations (time instants) of the voltage level crossings, the algorithm must find neighboring pairs of voltage values of the reference waveform one of which is below and the other of which is above one of the voltage levels.

In step S36 (see FIG. 5) the sequence of voltage vectors is generated. This will be explained with reference to FIG. 10.

Figure 10:
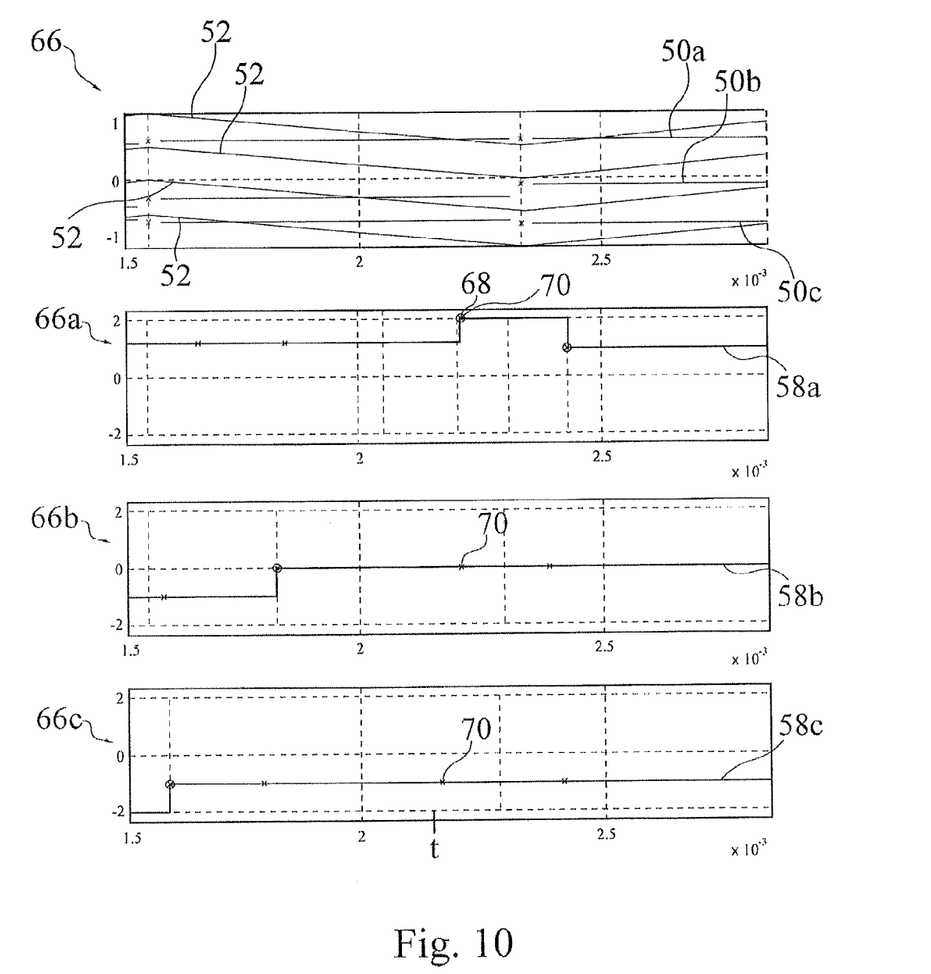
FIG. 10 shows four diagrams with the results of the prediction method.

FIG. 10 shows four diagrams 66, 66a, 66b, 66c with the results of the prediction method with a 4 transition horizon. In all diagrams 66, 66a, 66b, 66c, the x-axis shows the time in seconds. Diagram 66 shows four carrier waveforms 52, a reference waveform 50a for a first phase, a second reference waveform 50b for a second phase and a third reference waveform 50c for a third phase. Diagram 66a shows the output voltage waveform 58a generated from the reference waveform 50a, diagram 66b shows the output voltage waveform 58b generated from the reference waveform 50b and diagram 66c shows the output voltage waveform 58c generated from the reference waveform 50c.

In each of the diagrams 66a, 66b, 66c, the switching instants 70 generated for all three phases in the steps S32 and S34 are indicated by small x's. The phase in which the switching transition occurs is indicated by a circle 68 around the x.

For every switching transition 68 at a certain time instant t for one of the phases, the voltage level is maintained or sustained in the other phases.

After that for the switching instants at every time instant t, a voltage vector is formed including the switching time of the switching instants and the three voltage levels for the phases. The time ordered set of voltage vectors then forms the sequence of voltage vectors predicted by the algorithm.

The voltage vectors of the sequence of voltage vectors may be stored in an array $V_{vectors}$:

$$V_{Vectors} = \begin{pmatrix} 1 & 2 & 1 & \dots \\ -1 & 0 & 0 & \dots \\ -1 & -1 & -1 & \dots \end{pmatrix}$$

The generated sequence of voltage vectors, for example, the predicted voltage levels along with the switching times can then be provided to the method of FIG. 4 for determining an optimal or optimized sequences of phase states.

It has to be noted that another order of the calculation steps, different from the order indicated in FIG. 5 is possible. For example, the transition times of the reference waveform from one carrier level to another (and thus the time instants of the additional switching instants) may be determined before the switching instants for one carrier level are calculated.

Further, for example, the switching instants of step S32 may be calculated separately for the positive and the negative slopes of the carrier waveform. For example in FIG. 9 the first transition of the reference waveform 50 occurs on a negative carrier slope while the second is on a positive slope. Thus two selection vectors are created to correctly combine the transitions: positive slope=[2 4 . . . ]; negative slope=[1 3 . . . ]. These two arrays may be combined to one time ordered array of voltage levels.

Out of the time ordered array for each phase, the array $V_{vectors}$ containing the voltage vector level for each phase corresponding to each switching instant may be created according to the slope of the next carrier and scaled to the previously determined reference waveform partitioning.

As a final step, the additional voltage level values due to the level transitions may be inserted into the array $V_{vectors}$ at the corresponding time ordered instants.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practicing the claimed disclosure, from a study of the drawings, the disclosure, and the appended claims. In the claims, the words "comprising" and "including" do not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 10 motor system
12 motor
14 converter circuit
16 phase module
18 phase output
20 earthed output
P1, P2, P3 phase
UP1, UP2, UP3 phase voltage
22, 24 input
23 transformer
25 rectifier
UDC supply voltage
26 controller
28 DC link
30, 32 capacitors 34 neutral point
36, 38 inverter circuit
40 switch
U+ positive potential
U− negative potential
Uo neutral point potential
42 voltage vector
50, 50a, 50b, 50c reference waveform
52 carrier waveform
54 first slope
56 carrier level
58, 58a, 58b, 58c output voltage waveform
60 upper output voltage
62 lower output voltage
64a, 64b additional switching instants
66, 66a, 66b, 66c diagram with results
68, 70 switching instants

What is claimed is:

1. A method for controlling a converter, wherein the converter is configured for generating an AC current for at least two phases by outputting different voltage levels for each phase, wherein the different voltage levels depend on switching states of the converter, the method comprising:
 (a) generating a first sequence of voltage vectors, each voltage vector including a voltage level for each phase, by (i) generating a reference waveform for each phase, and (ii) determining the voltage levels for a phase for each voltage vector of the first sequence by deriving the voltage levels from the respective reference waveform for the phase;
 (b) determining a set of equivalent sequences of voltage vectors by: (i) calculating voltage level differences for each voltage vector of the sequence of voltage vectors, the voltage level differences being differences of voltage levels of the voltage vector, (ii) determining an equivalent voltage vector with equal voltage differences, and (iii) generating an equivalent sequence by replacing at least one voltage vector of the first sequence with the equivalent voltage vector;
 (c) selecting one sequence from the set of equivalent sequences which optimizes an internal state of the converter, when the sequence is applied to the converter; and
 (d) applying the first voltage vector of the selected sequence to the converter.

2. The method of claim 1, wherein the reference waveform is generated based on at least one of a reference profile, a reference time, and a maximal amplitude.

3. The method of claim 1, wherein in step (a) a voltage level for a phase is derived from the reference waveform by intersecting the reference waveform with at least one carrier waveform having periodic positive and negative slopes,
 wherein the at least one carrier waveform covers an interval between a lower voltage level and a higher voltage level of the converter, and
 wherein the voltage level is set to the lower voltage level if the reference waveform intersects a positive slope of the carrier waveform, and the voltage level is set to the higher voltage level if the reference waveform intersects a negative slope of the carrier waveform.

4. The method of claim 3, wherein each voltage level of a phase relates to a time instant, and
 wherein the time instant is the time instant at which the carrier waveform intersects the reference waveform.

5. The method of claim 3, wherein in the positive slope the carrier waveform linearly increases from the lower voltage level to the higher voltage level, and
 wherein in the negative slope the carrier waveform linearly decreases from the higher voltage level to the lower voltage level.

6. The method of claim 3, wherein an additional voltage level for a phase is derived from the reference waveform, when the reference waveform intersects a voltage level between two carrier waveforms, and
 wherein the additional voltage level for a phase is set to the next higher voltage level if the reference waveform increases at the point of intersection, and the additional voltage level for a phase is set to the next lower voltage level if the reference waveform decreases at the point of intersection.

7. The method of claim 6, wherein the additional voltage level of a phase is related to a time instant, and
 wherein the time instant is the time instant at which the reference waveform intersects the voltage level between two carrier waveforms.

8. The method of claim 3, wherein the reference waveform includes a sequence of voltage values, each voltage value relating to a time instant, and
 wherein, when calculating the intersection between a carrier waveform and the reference waveform, the reference waveform is interpolated between the voltage values.

9. The method of claim 8, wherein the reference waveform between a first voltage and a consecutive second voltage values is interpolated as being the first voltage value.

10. The method of claim 1, wherein in step (c) the sequence is selected by:
 estimating the internal state of the converter by applying the sequence to a model of the converter; and
 selecting the sequence with the optimal estimated internal state.

11. The method of claim 1, wherein in step (c) the sequence is selected such that at least one of the following internal states of the converter is optimized:
 a neutral point potential lies within predefined bounds;
 at least one of switching losses and the switching frequency are minimized;
 at least one of a common mode voltage and variations of the common mode voltage are minimized; and
 an average deviation of an internal state from a predefined internal state is minimal.

12. A non-transitory computer-readable recording medium having a computer program recorded thereon that causes a processor of a computer processing device to execute operations for controlling a converter, wherein the converter is configured for generating an AC current for at least two phases by outputting different voltage levels for each phase, wherein the different voltage levels depend on switching states of the converter, and wherein the operations comprise:
 (a) generating a first sequence of voltage vectors, each voltage vector including a voltage level for each phase, by (i) generating a reference waveform for each phase, and (ii) determining the voltage levels for a phase for each voltage vector of the first sequence by deriving the voltage levels from the respective reference waveform for the phase;
 (b) determining a set of equivalent sequences of voltage vectors by: (i) calculating voltage level differences for each voltage vector of the sequence of voltage vectors, the voltage level differences being differences of voltage levels of the voltage vector, (ii) determining an equivalent voltage vector with equal voltage differences, and (iii) generating an equivalent sequence by replacing at least one voltage vector of the first sequence with the equivalent voltage vector;

(c) selecting one sequence from the set of equivalent sequences which optimizes an internal state of the converter, when the sequence is applied to the converter; and (d) applying the first voltage vector of the selected sequence to the converter.

13. A controller for controlling a converter, wherein the converter is configured for generating an AC current for at least two phases by outputting different voltage levels for each phase, wherein the different voltage levels depend on switching states of the converter, wherein the controller comprises a processing unit configured to:

(a) generate a first sequence of voltage vectors, each voltage vector including a voltage level for each phase, by (i) generating a reference waveform for each phase, and (ii) determining the voltage levels for a phase for each voltage vector of the first sequence by deriving the voltage levels from the respective reference waveform for the phase;

(b) determine a set of equivalent sequences of voltage vectors by: (i) calculating voltage level differences for each voltage vector of the sequence of voltage vectors, the voltage level differences being differences of voltage levels of the voltage vector, (ii) determining an equivalent voltage vector with equal voltage differences, and (iii) generating an equivalent sequence by replacing at least one voltage vector of the first sequence with the equivalent voltage vector;

(c) select one sequence from the set of equivalent sequences which optimizes an internal state of the converter, when the sequence is applied to the converter; and (d) apply the first voltage vector of the selected sequence to the converter.

14. A converter comprising:

a converter circuit with switches, the converter circuit being configured for generating output voltages for at least two phases, the output voltages corresponding to different voltage levels generated by switching states of the switches; and the controller of claim 13, the controller being configured for controlling the switches.

15. The method of claim 2, wherein in step (a) a voltage level for a phase is derived from the reference waveform by intersecting the reference waveform with at least one carrier waveform having periodic positive and negative slopes, wherein the at least one carrier waveform covers an interval between a lower voltage level and a higher voltage level of the converter, and wherein the voltage level is set to the lower voltage level if the reference waveform intersects a positive slope of the carrier waveform, and the voltage level is set to the higher voltage level if the reference waveform intersects a negative slope of the carrier waveform.

16. The method of claim 15, wherein each voltage level of a phase relates to a time instant, and wherein the time instant is the time instant at which the carrier waveform intersects the reference waveform.

17. The method of claim 16, wherein in the positive slope the carrier waveform linearly increases from the lower voltage level to the higher voltage level, and wherein in the negative slope the carrier waveform linearly decreases from the higher voltage level to the lower voltage level.

18. The method of claim 17, wherein an additional voltage level for a phase is derived from the reference waveform, when the reference waveform intersects a voltage level between two carrier waveforms, and wherein the additional voltage level for a phase is set to the next higher voltage level if the reference waveform increases at the point of intersection, and the additional voltage level for a phase is set to the next lower voltage level if the reference waveform decreases at the point of intersection.

19. The method of claim 18, wherein the additional voltage level of a phase is related to a time instant, and wherein the time instant is the time instant at which the reference waveform intersects the voltage level between two carrier waveforms.

20. The method of claim 19, wherein the reference waveform includes a sequence of voltage values, each voltage value relating to a time instant, and wherein, when calculating the intersection between a carrier waveform and the reference waveform, the reference waveform is interpolated between the voltage values.

21. The method of claim 20, wherein the reference waveform between a first voltage and a consecutive second voltage values is interpolated as being the first voltage value.

22. The method of claim 20, wherein the reference waveform is linearly interpolated between a first voltage value and a consecutive second voltage value.

23. The method of claim 8, wherein the reference waveform is linearly interpolated between a first voltage value and a consecutive second voltage value.

* * * * *